United States Patent [19]

Höwing

[11] Patent Number: 4,638,113
[45] Date of Patent: Jan. 20, 1987

[54] TRANSPOSED BAR FOR AN ELECTRICAL MACHINE

[75] Inventor: Jürgen Höwing, Berlin, Fed. Rep. of Germany

[73] Assignee: Siemens Aktiengesellschaft, Munich and Berlin, Fed. Rep. of Germany

[21] Appl. No.: 752,408

[22] Filed: Jul. 5, 1985

[30] Foreign Application Priority Data

Jul. 11, 1984 [DE] Fed. Rep. of Germany ....... 3425982

[51] Int. Cl.<sup>4</sup> ............................................. H02K 3/14
[52] U.S. Cl. ..................................... 174/34; 310/213; 336/187
[58] Field of Search .......................... 174/34; 310/213; 336/187

[56] References Cited

U.S. PATENT DOCUMENTS

| 4,260,924 | 4/1981 | Lugosi et al. | 310/213 |
| 4,295,071 | 10/1981 | Kaspar | 174/34 X |
| 4,308,476 | 12/1981 | Schuler | 310/213 X |
| 4,321,426 | 3/1982 | Schaeffer et al. | 336/187 X |

OTHER PUBLICATIONS

Herstellung der Wicklungen elektrisher Maschinen, authored by H. Sequenz, published by Springer-Verlag, Chapter 2, pp. 141 & 142 and FIG. 83, p. 1, lines 14–27.

Primary Examiner—Arthur T. Grimley
Assistant Examiner—Morris H. Nimmo
Attorney, Agent, or Firm—F. W. Powers; J. L. James

[57] ABSTRACT

To simplify the fabrication and use of a transposed bar, the strip of insulating material for the strut projects higher than the conductor element stack and is incised along the longitudinal edges. Sections are formed, some of which (i.e., those immediately adjoining the offset location) are bent to be positioned below the offset points during the inserting of the strip. The non-incised surface of the strip serves as the strut of the transposed bar. The need for manual insertion of square- or diamond-shaped strips for additional insulation of the offset points is thereby eliminated. As the sections also contain a hardening resin, the internal corona shielding is improved.

3 Claims, 3 Drawing Figures

TRANSPOSED BAR FOR AN ELECTRICAL MACHINE

BACKGROUND OF THE INVENTION

This invention relates to materials for the manufacture of electrical machines and more particularly to transposed bars consisting of mutually insulated conductor elements which are arranged in adjoining stacks passing through all levels and are ultimately transposed in an alternating fashion along the narrow-bar sides by offsets passing from one conductor element side to the other.

In a known design, one strip of insulating material designated as the strut is mounted between the conductor element stacks expanding vertically throughout their height and length, while in addition further insulating strips are positioned horizontally beneath the offset points of the conductor elements. This transposed bar is known from the book, "Herstellung der Wicklungen elektrischer Maschinen", published by H. Sequenz, Springer Publishing House, 1973, with the transposed bar consisting of two conductor element stacks. When mating the two conductor element stacks, a strut is inserted between them, serving for additional insulation for the conductor elements which pass through the various levels and thus often intersect. Subsequently, at the offset points square or diamond-shaped insulating strips are manually inserted for additional insulation. Manual insertion of the insulating strips requires additional work which can hardly be handled by automated manufacturing. It is desirable to simplify the manufacturing of a transposed bar of this general type.

It is the object of this invention to simplify the manufacture of a transposed bar made up of conductor element stacks separated by insulating struts.

SUMMARY OF THE INVENTION

Briefly stated in accordance with one aspect of the invention, the foregoing object is achieved by providing a transposed bar of an electrical machine consisting of mutually insulated conductor elements which are arranged in adjoining conductor element stacks, pass through all levels, and are transposed at the narrow sides of the bars by offsets alternating from one to the other conductor element stack. A strip of insulating material designated as a strut is arranged vertically between the conductor element stack and extends beyond their height and length. Insulating material is also arranged horizontally beneath offset points of the conductor elements within the stacks. The strip of insulating material forming the strut is higher than the conductor element stacks and the strip has uniform incisions running along both longitudinal edges thereof, forming sections whose vertical spacing matches the height of the conductor element stacks. Some of these sections of the strut are bent to fill the positions located beneath each of the offset points thereby providing insulation material at that location.

In a transposed bar designed in this fashion, no additional insulating strips have to be placed beneath the offset points since the strut and insulating strips form one piece, thereby reducing the fabrication expenditure since the sections position themselves beneath the offset points when the insulation is inserted. The non-incised portion of the strip assumes the role of the strut, and the bent sections assume the task of the insulating strips beneath the offset points. Reliable insulation of the offset points is attained if the horizontal spacing of the incisions among themselves is less than or equal to the spacing of the offset points.

The incisions can be easily fabricated if they run perpendicularly to the longitudinal edges of the strip.

If the transposed bar has areas where there is no transposition of the conductor elements, as, for example, can be the case in the area adjoining the bar ends, it makes sense to select the height of the strip to be greater than the height of the conductor element stacks only in the transposed area since the excess of the insulating strip in the non-transposed portion can lead to problems when mounting the slot insulation at a later point.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
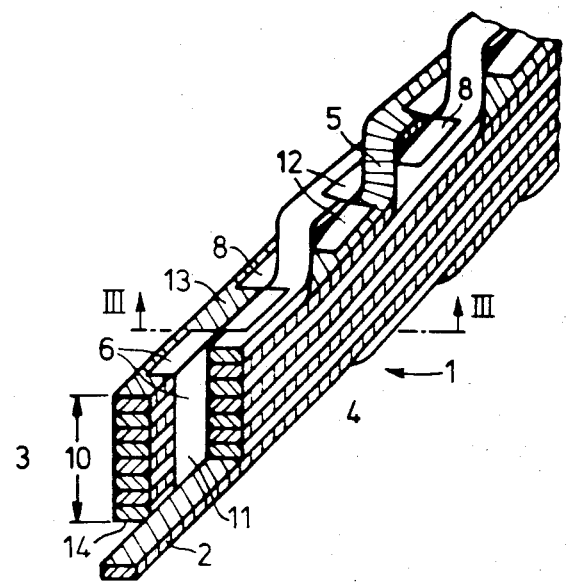
FIG. 1 shows a perspective view of a sectioned transposed bar. To clarify the alignment of the conductor elements, each second conductor element is identified by cross-hatched lines.
Figure 2:
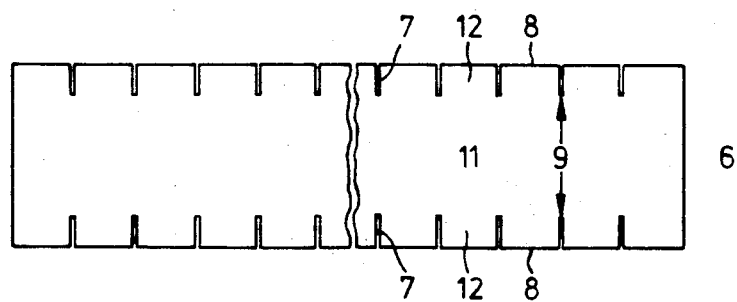
FIG. 2 shows an elevation of an insulating strip before being inserted into the transposed bar.
Figure 3:
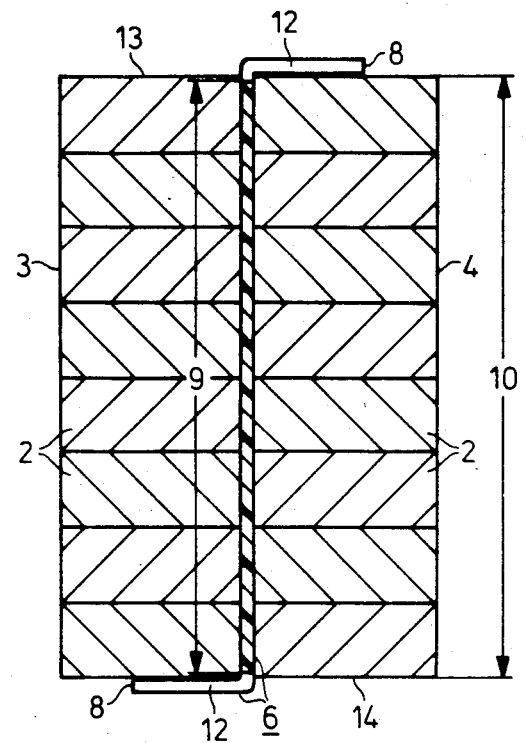
FIG. 3 is a diagrammatic cross-sectional view taken along line III—III of FIG. 2.

Referring to the drawings, transposed bar 1 of an electrical machine consists of individually insulated conductor elements 2 made of copper strips. The conductor elements 2 alternate at the upper narrow side 13 of transposed bar 1 from conductor element stack 3 to conductor element stack 4 and at the lower narrow side 14 of conductor element stack 4 to conductor element stack 3 by offsets. Before offset points 5 the conductor elements in the one conductor element stack are aligned in an upward incline, while in the other conductor element stack in a downturning incline so that they pass through all levels of bar 1 so as to minimize the eddy currents in case of one-sided current displacement.

In the transposed area of bar 1 the conductor element 2 of both conductor element stacks 3 and 4 cross since they pass through all levels. Between conductor element stacks 3, 4 a strip 6 of insulating material which is higher than conductor element stacks 3, 4 before being inserted is inserted with a hardening resin surface layer. Said insulating strip 6 is prepared uniformly with incisions or slits 7, which run perpendicularly along both longitudinal edges 8, whose vertical spacing 9 is the same as the height 10 of conductor element stacks 3, 4 and whose horizontal spacing from each other equals half the offset point spacing.

The non-incised surface 11 serves as the strut of the additional insulation between the intersecting conductor elements 2. While the sections 12 formed by the incisions 7 bend during insertion of strip 6 and thereby are positioned beneath the offset points 5, they also maintain the space required for the conductor elements 2 positioned beneath them. This prevents a loose fit of separate insulating strips beneath the offset points from becoming loose and falling out of place during further processing as was possible in the previous assembly design. This is no longer possible with the sections 12, which helps to simplify fabrication and use.

The sections 12 contain a hardening resin material, as does the non-incised surface 11. During hardening the conductor elements stick together, and the resin fills the interspaces between the conductors and strip of insulating material at the offset points 5. Thus, no air pockets can form which could be the cause for disruptive corona discharge. Thus, the internal corona shielding is improved.

It will now be understood that there has been disclosed an improved transposed bar for an electrical machine. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A transposed bar for an electrical machine consisting of individually insulated conductor elements which are arranged in adjoining conductor element stacks, each conductor element passing through all levels and being transposed at the narrow sides of the bars by offsets alternating from one to the other conductor element stack, in which a strip of insulating material designated as a strut is arranged vertically between the conductor element stacks extending beyond the conductor element stacks in height and wherein a plurality of sections of insulating material are positioned horizontally beneath a plurality of offset points of the conductor elements, the improvement comprising, having uniform incisions on the strip running along both longitudinal edges forming the plurality of sections with that portion between each opposite incision having a vertical height which matches the height of the conductor element stacks, the sections being bent into a horizontal position located underneath the offset points of the transposed conductor element.

2. A transposed bar in accordance with claim 1, wherein the incisions following one another in the length of the bar have a distance between them equal to or smaller than the distance between the offset points.

3. A transposed bar in accordance with claim 1, wherein the incisions run perpendicularly to the longitudinal edges of the strip.

* * * * *